(12) United States Patent
Hoffmann et al.

(10) Patent No.: US 9,780,930 B2
(45) Date of Patent: *Oct. 3, 2017

(54) COMMUNICATING REFERENCE AND DATA INFORMATION IN A WIRELESS NETWORK

(71) Applicant: IPR Licensing, Inc., Wilmington, DE (US)

(72) Inventors: John E. Hoffmann, Indialantic, FL (US); George Rodney Nelson, Merritt Island, FL (US); James A. Proctor, Indialantic, FL (US); Antoine J. Rouphael, Escondido, CA (US)

(73) Assignee: IPR Licensing, Inc., Wilmington, DE (US)

(*) Notice: Subject to any disclaimer, the term of this patent is extended or adjusted under 35 U.S.C. 154(b) by 128 days.

This patent is subject to a terminal disclaimer.

(21) Appl. No.: 14/602,982

(22) Filed: Jan. 22, 2015

(65) Prior Publication Data

US 2015/0131620 A1 May 14, 2015

Related U.S. Application Data

(63) Continuation of application No. 12/339,969, filed on Dec. 19, 2008, now Pat. No. 8,958,457, which is a continuation of application No. 11/103,202, filed on Apr. 11, 2005, now Pat. No. 7,483,473, which is a continuation of application No. 09/766,875, filed on Jan. 19, 2001, now Pat. No. 6,904,079.

(60) Provisional application No. 60/181,071, filed on Feb. 8, 2000.

(51) Int. Cl.
*H04L 5/00* (2006.01)
*H04B 1/707* (2011.01)
*H04L 7/04* (2006.01)

(52) U.S. Cl.
CPC .......... *H04L 5/0046* (2013.01); *H04B 1/707* (2013.01); *H04B 2201/70701* (2013.01); *H04L 7/041* (2013.01)

(58) Field of Classification Search
USPC .............................. 370/328–338, 342, 500
See application file for complete search history.

(56) References Cited

U.S. PATENT DOCUMENTS

| | | | |
|---|---|---|---|
| 5,414,728 A | 5/1995 | Zehavi | |
| 5,748,676 A | 5/1998 | Mahany | |
| 5,809,083 A | 9/1998 | Wright | |
| 5,907,813 A | 5/1999 | Johnson et al. | |

(Continued)

FOREIGN PATENT DOCUMENTS

| | | |
|---|---|---|
| EP | 0 847 145 | 11/1997 |
| JP | 11-331042 | 11/1999 |

(Continued)

OTHER PUBLICATIONS

Yang, "CDMA RF System Engineering," pp. 105-131 (1998).

(Continued)

*Primary Examiner* — Brian D Nguyen
*Assistant Examiner* — Deepa Belur
(74) *Attorney, Agent, or Firm* — Volpe and Koenig, P.C.

(57) ABSTRACT

A mobile device may generate reference bits. The mobile device may also produce a frame to send in an uplink transmission having two portions selectively with the reference bits or data bits.

28 Claims, 6 Drawing Sheets

(56) References Cited

U.S. PATENT DOCUMENTS

| | | | |
|---|---|---|---|
| 5,920,551 A * | 7/1999 | Na | H04B 1/707 370/335 |
| 5,943,606 A | 8/1999 | Kremm et al. | |
| 6,108,317 A * | 8/2000 | Jones | H04B 7/18528 370/320 |
| 6,122,264 A | 9/2000 | Kaufman et al. | |
| 6,167,056 A * | 12/2000 | Miller | H04B 1/7077 370/320 |
| 6,188,679 B1 * | 2/2001 | Sato | H04B 1/7073 370/335 |
| 6,304,624 B1 | 10/2001 | Seki et al. | |
| 6,347,220 B1 * | 2/2002 | Tanaka | H01Q 1/246 370/320 |
| 6,381,229 B1 | 4/2002 | Narvinger et al. | |
| 6,389,034 B1 | 5/2002 | Guo et al. | |
| 6,519,296 B1 | 2/2003 | Hladik | |
| 6,542,743 B1 * | 4/2003 | Soliman | H04B 1/70754 370/331 |
| 6,545,990 B1 * | 4/2003 | Amalfitano | H04W 72/04 370/335 |
| 6,594,248 B1 | 7/2003 | Kama et al. | |
| 6,801,564 B2 | 10/2004 | Rouphael et al. | |
| 6,904,079 B2 | 6/2005 | Hoffmann et al. | |
| 7,046,717 B2 | 5/2006 | Kanterakis et al. | |
| 7,054,298 B1 * | 5/2006 | Kim | H04B 7/2668 370/335 |
| 7,079,522 B1 * | 7/2006 | Kim | H04W 52/146 370/342 |
| 8,958,457 B2 * | 2/2015 | Hoffman | 375/145 |
| 2001/0019541 A1 * | 9/2001 | Jou | H04B 17/318 370/311 |
| 2001/0026599 A1 * | 10/2001 | Hoffmann | H04B 1/707 375/343 |
| 2007/0237181 A1 * | 10/2007 | Cho | H04J 3/0602 370/478 |
| 2008/0130529 A1 * | 6/2008 | Khandekar | H04B 7/2656 370/296 |
| 2010/0260080 A1 * | 10/2010 | Hao | H04L 5/0053 370/280 |

FOREIGN PATENT DOCUMENTS

| | | |
|---|---|---|
| WO | 97/39557 | 10/1997 |
| WO | 99/60729 | 11/1999 |
| WO | 99/67921 | 12/1999 |

OTHER PUBLICATIONS

Telecommunications Industry Association, "TIA/EIA Standard, Mobile Station-Base Station Compatibility Standard for Wideband Spread Spectrum Cellular Systems, TIA/EIA-95B (Upgrade and Revision of TIA/EIA-95A)," (Mar. 1999).

* cited by examiner

COMMUNICATING REFERENCE AND DATA INFORMATION IN A WIRELESS NETWORK

CROSS REFERENCE TO RELATED APPLICATIONS

This application is a continuation of U.S. patent application Ser. No. 12/339,969 filed Dec. 19, 2008, which is a continuation of U.S. patent application Ser. No. 11/103,202 filed Apr. 11, 2005, which issued as U.S. Pat. No. 7,483,473 on Jan. 27, 2009, which is a continuation of U.S. patent application Ser. No. 09/766,875 filed Jan. 19, 2001, which issued as U.S. Pat. No. 6,904,079 on Jun. 7, 2005, which claims the benefit of U.S. Provisional Patent Application Ser. No. 60/181,071 filed Feb. 8, 2000, which are all incorporated by reference as if fully set forth.

BACKGROUND OF THE INVENTION

The present invention relates generally to the field of wireless digital communications and more particularly to a technique for encoding access channel signals.

The increasing use of wireless telephones and personal computers has led to a corresponding demand for advanced wireless communication services which were once thought only to be meant for use in specialized applications. In particular, wireless voice communication first became widely available at low cost through the cellular telephone network. The same has also become true for distributed computer networks, whereby low cost, high speed access to data networks is now available to the public through Internet Service Providers (ISPs). As a result of the widespread availability of both technologies, the general population now increasingly wishes to be able to access the Internet using portable computers and Personal Digital Assistants (PDAs) over wireless links.

The most recent generation of wireless communication technologies makes use of digital modulation techniques in order to allow multiple users to share access to the available frequency spectrum. These techniques purportedly increase system capacity for a radio channel of a given available radio bandwidth. The technique which has emerged as most popular within the United States is a type of Code Division Multiple Access (CDMA). With CDMA, each transmitted radio signal is first encoded with a pseudorandom (PN) code sequence at the transmitter. Each receiver includes equipment that performs a PN decoding function. The properties of the PN codes are such that signals encoded with different code sequences or even with different code phases can be separated from one another at the receiver. The CDMA codes thus permit signals to be transmitted on the same frequency and at the same time. Because PN codes in and of themselves do not provide perfect separation of the channels, certain systems have added an additional layer of coding, and/or use modified PN codes. These additional codes, referred to as orthogonal codes, and/or modified PN codes encode the user signals so that they are mathematically exclusive in order to further reduce interference between channels.

In order for the CDMA code properties to hold true at the receiver, certain other design considerations must be taken into account. One such consideration involves the signals traveling in a reverse link direction, that is, from a field unit back to the central base station. In particular, the orthogonal properties of the codes are mathematically optimized for a situation where individual signals arrive at the receiver with approximately the same power level. If they do not, interference between the individual signals which arrive at the base station increases. Precise control over the level of each signal transmitted on the reverse link is thus critical.

More particularly, most CDMA systems are structured such that the forward link channels, that is, the channels carrying information from the base station towards the field unit, are different from the reverse channels. The forward link typically consists of three types of logical channels known as the pilot, paging, and traffic channels. The pilot channel provides the field unit with timing and phase reference information. Specifically, the pilot channel contains a sequence of data bits that permits the field unit to synchronize its PN decoding function with the PN coding used in the base station. The pilot channel is, therefore, typically transmitted continuously by the base station to facilitate the field units demodulation of the other forward link channels.

The paging channel is used to inform the field unit of additional information needed to communicate. Such information is typically management information which informs the field unit of which traffic channels it may use, for example. Other types of paging messages are used to communicate system parameters, access parameters, neighbor lists and other information needed for the field unit to manage its communication in such a way that it does not interfere with other field units transmissions.

The forward traffic channels are used to transmit user data and/or voice signaling information from the base station to the field unit.

On the reverse link, there are typically at least two types of logical channels, including an access channel and traffic channels. The access channel is used by the field unit to send a message to request access to traffic channels when it has data to communicate to the base station. The field unit thus uses the access channel to make requests for connection originations and to respond to paging messages. The traffic channels on the reverse link serve the same purpose as the traffic channels on the forward link, namely, to transmit user data and/or digitized voice payload information.

Pilot channels are not typically used on the reverse link. There are perhaps several reasons for this. For example, the most widely deployed CDMA systems, such as the IS-95 compatible system as specified by the Telecommunications Industry Association (TIA), use asynchronous reverse link traffic channels. It is typically thought that the overhead associated with allowing each field unit to transmit on its own dedicated pilot channel is not necessary. It is also thought that the overhead associated with decoding and detecting a large number of pilot channels back at the base station would not justify any perceived increase in performance.

SUMMARY OF THE INVENTION

In general, pilot signals are advantageous since they provide for synchronous communication. If the communications on the reverse link traffic channels can be synchronized among various field units, parameters can be better optimized for each link individually. It would therefore be advantageous to make pilot signals available for use on the reverse link.

Furthermore, the use of pilot channels on the reverse link would assist in combating effects due to multipath fading. Especially in urban environments where many tall buildings and other surfaces may reflect radio signals, it is common for not just one version of each transmitted signal to arrive at a receiver. Rather, different versions of a particular transmitted signal, each associated with a particular delay, may be actually received. Having additional synchronization timing information available at the base station can help properly decode reverse link signals which have experienced a multipath fade.

The present invention is a technique for efficient implementation of pilot signals on a reverse link in a wireless communication system encompassing a base station which services a large number of field units. According to one aspect of the invention, an access channel is defined for the reverse link such that within each frame or epoch, a preamble portion of the frame is dedicated to sending only pilot symbols. Another portion of each access channel frame, called the payload portion, is then reserved for sending data symbols. In this payload portion of the frame, additional pilot symbols are interleaved among the data symbols.

In the preferred embodiment, the pilot symbols are inserted at predictable, regular intervals among the data symbols.

The preamble portion of the access channel frame allows for efficient acquisition of the access signal at the base station, and provides a timing reference for separating the data and pilot symbols in the payload portion, as well as a timing reference for, optionally, dealing with the effects of multipath fading. This is accomplished by feeding the preamble portion to a pilot correlation filter. The pilot correlation filter provides a phase estimate from the pilot symbols in the preamble portion, which is then used to decode the data symbols in the payload portion.

An access acquisition portion of the receiver then uses these phase estimates provided by the pilot correlation filter to process the output of a data symbol correlation filter.

The additional pilot symbols embedded in the payload portion are preferably used in a cross product modulator to further undo the effects of multipath fading.

The preamble portion of the frame may be defined by Barker sequences, which further assist with properly aligning the timing.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
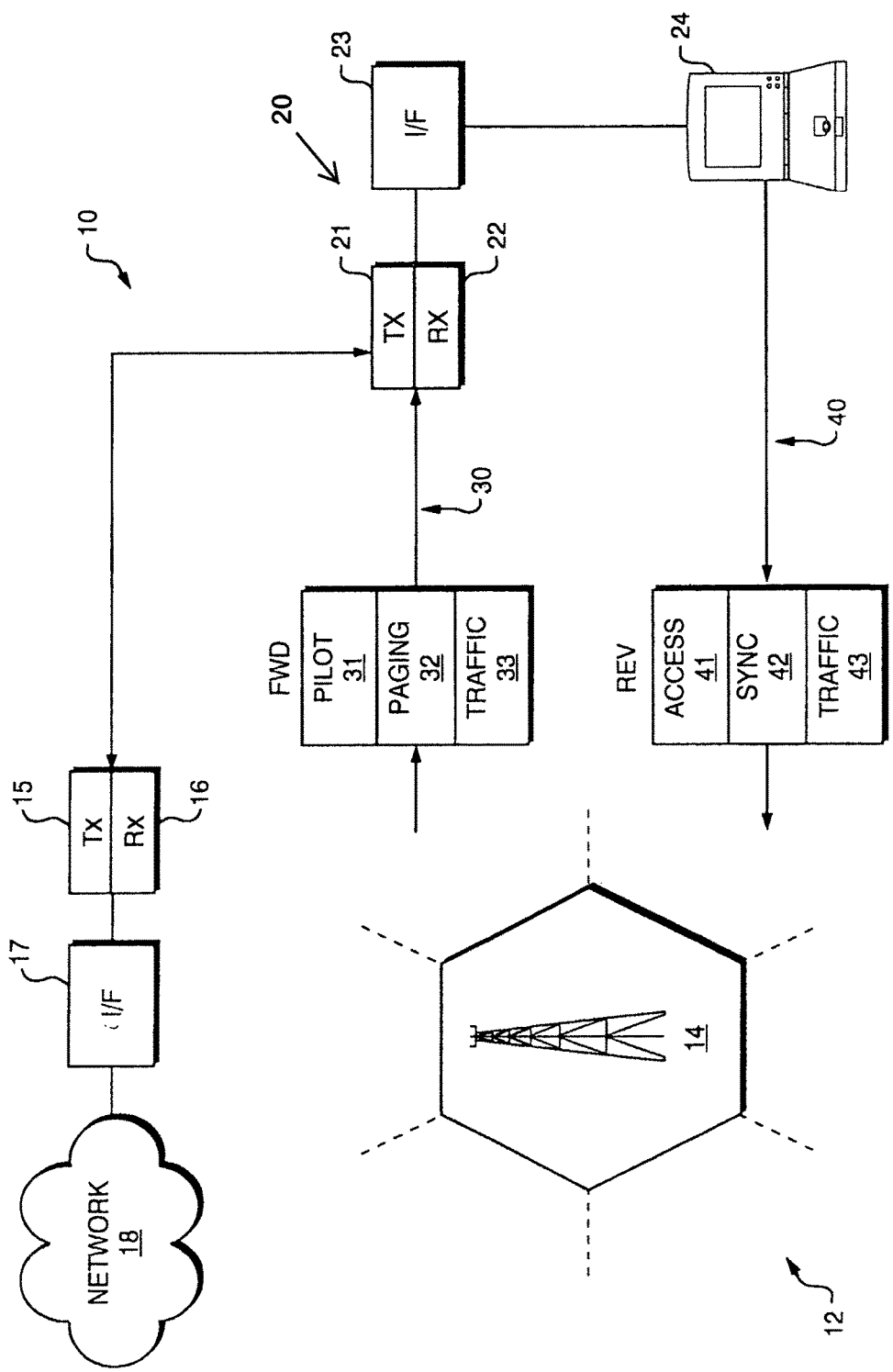
FIG. 1 is a block diagram of the system which uses embedded pilot symbol assisted coherent demodulation according to the invention.

Turning attention to the drawings, FIG. 1 is a generalized diagram showing a wireless data communication system 10 that makes use of an access channel having embedded pilot symbols in order to effectuate coherent demodulation. The system 10 consists of a base station 12 and a field unit 20. The base station 12 is typically associated with a predetermined geographic region 14 in which wireless communication service is to be provided.

The base station 12 contains several components, including a radio transmitter 15, receiver 16, and interface 17. The interface 17 provides a data gateway between the base station 12 and a data network 18 such as the Internet, a private network, a telephone network, or other data network.

The field unit 20 consists of a corresponding receiver 21, transmitter 22, and interface 23. The interface 23 permits the field unit 20 to provide data signals to and receive data signals from computing equipment 24 such as a laptop computer, Personal Digital Assistant (PDA), or other computing equipment. The interface 23 may be a PCMCIA bus, USB port, or other standard computer interface.

The base station 12 communicates with the field unit 20 by exchanging radio signals over various radio channels. The present invention is of particular advantage in a system 10 which uses Code Division Multiple Access (CDMA) modulation to define the channels. In the specific embodiment discussed herein, it is therefore understood that a specific pseudorandom (PN) code (which may or may not be augmented with orthogonal codes) is used to define each of the various logical channels on a given radio carrier frequency.

The forward link 30 consists of various types of logical channels, including at least a pilot channel 31, a paging channel 32, and one or more traffic channels 33. The forward link 30 is responsible for forwarding data signals from the base station 12 towards the field unit 20.

The pilot channel 31 contains typically no baseband information, but rather a stream of bits that are used to permit the field unit 20 to synchronize to the signals sent in the other forward link logical channels such as the paging channel 32 and traffic channels 33.

The paging channel 32 is used to transmit messages from the base station 12 to the field unit 20 that control various aspects of communication, but most importantly, control assignment of various traffic channels 33 for use by each field unit 20.

The forward traffic channels 33 are used to transmit data voice or other signaling messages from the base station 12 towards the field unit 20.

Signals are also carried from the field unit 20 towards the base station 12 over a reverse link 40. The reverse link 40 contains several logical channel types including at least an access channel 41, a synchronization (sync) channel 42, and one or more traffic channels 43.

For the reverse link 40, the access channel 41 is used by the field unit 20 to communication with the base station 12 during periods of time when the field unit 20 does not have a traffic channel 43 already assigned. For example, the field unit 20 typically uses the access channel 41 to originate request for calls as well as to respond to messages sent to it on the paging channel 32.

The sync channel 42 on the reverse link may assist in or with the traffic channels 43 to permit the field unit 20 to efficiently send data to the base station 12 using synchronous modulation techniques.

The present invention relates to the formatting and use of the reverse link access channel 41. Specifically, the invention uses an access channel 41 that contains within it certain formatting such as certain symbols used to convey pilot signal information.

Figure 2:
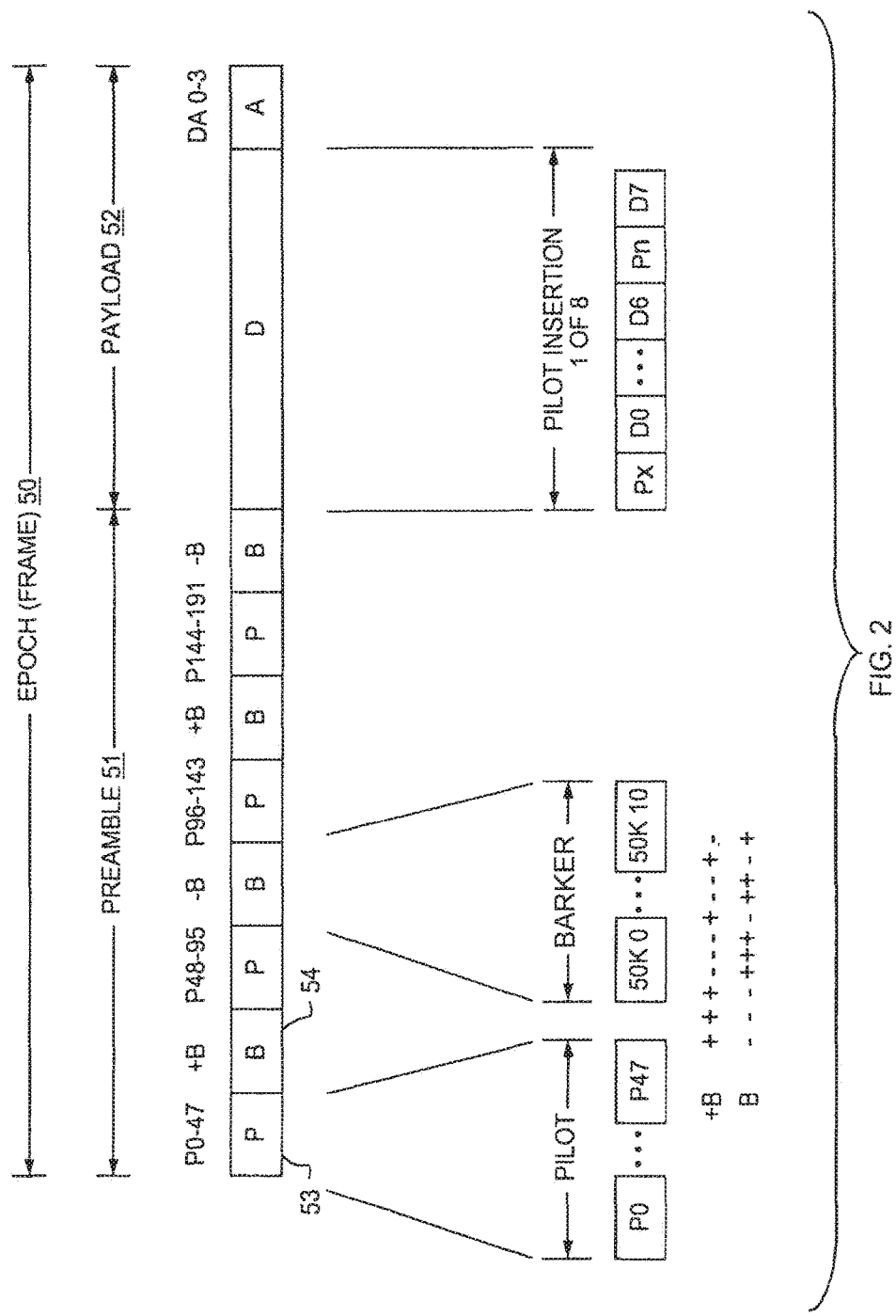
FIG. 2 is a detailed view of the format of data framing used on the access channel.

The access channel 41 signal format is shown in more detail in FIG. 2. An epoch or frame 50 consists of a preamble portion 51 and payload portion 52. The preamble 51 is further defined as a series of symbols including a pilot block 53 and Barker code block 54. Multiple pilot blocks 53 and Barker code blocks 54 make up the preamble 51; in the illustrated preferred embodiment, a pilot block 53 and Barker code block 54 are repeated four times in each frame 50. The Barker code blocks 54 assist in allowing the receiver to determine where the start of a frame 50 is.

Each pilot block 53 consists of a number of repeated pilot symbols. In the preferred embodiment, 48 pilot symbols are repeated in each pilot block 53. The pilot blocks 53 are used to assist with timing reception and decoding of the information symbols which make up the access channel 41.

The second portion of each frame 50 is the payload portion 52. The payload portion 52 includes a data portion consisting of the information to be sent from the field unit 20 to the base station 12. As shown in FIG. 2, pilot symbols 53 are inserted in the data portion of the payload portion 52. A pilot symbol, for example, may be inserted every eight payload symbols. As will be discussed in greater detail later, these pilot symbols embedded in the payload portion 52 further assist with the coherent demodulation process of the information contained in the data portion.

The pilot symbols 53 typically consist of a series of positive data bits only. Therefore, they do not in and of themselves contain timing information.

The Barker code blocks 54 may consist of predetermined patterns of bits, as shown in FIG. 2. Binary Phase Shift Keyed (BPSK) bit encoding may be used to indicate a Barker sequence consisting of three positive bits followed by three negative bits, followed by a single positive bit, a pair of negative bits, a positive bit, and then a negative bit. The positive logic Barker sequence +B may be alternately sent with the negative of the Barker sequence −B to further assist in aligning the beginning of each frame 50 at the receiver 16.

The use of multiple pilot blocks 53 and Barker code blocks 54 permit an averaging process to be performed in the acquisition of each access channel 41 is described further below.

Figure 3:
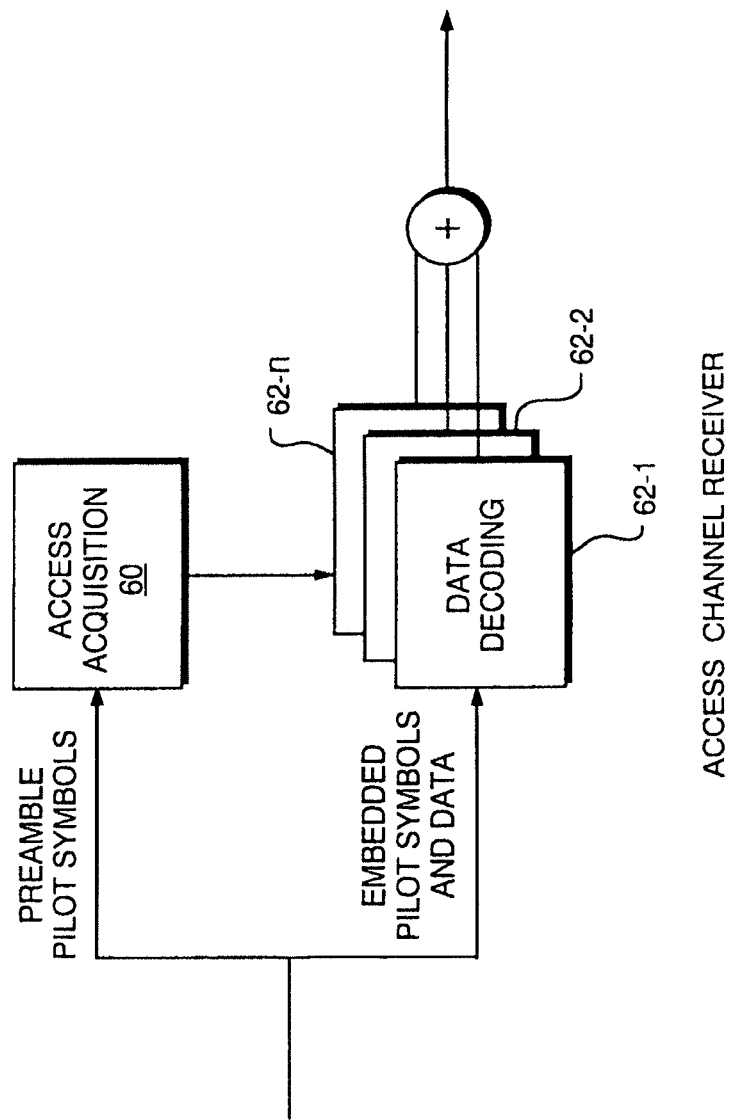
FIG. 3 is a high level diagram of the pilot symbol assisted demodulation process.

FIG. 3 is a generalized block diagram of the portion of the receiver 16 used by the base station 12 to demodulate the reverse link access channel 41. As shown, the access channel receiver consists of two functions including access acquisition function 60 and data decoding 62. In a preferred embodiment, multiple data decoding blocks 62-1, 62-2, . . . 62-n may be used as individual rake receiver portions, or receiver "fingers," tuned to different timing delays.

In general, the preamble pilot symbols are first processed by the access acquisition function 60. These provide generalized timing information which is then fed to the data decoding function 62, along with the payload portion containing the data symbols and embedded pilot symbols. Each of the individual fingers 62-1, 62-2, . . . , 62-n make use of the timing information provided by the access acquisition function 60 to properly decode the data in the access channel.

Figure 4:
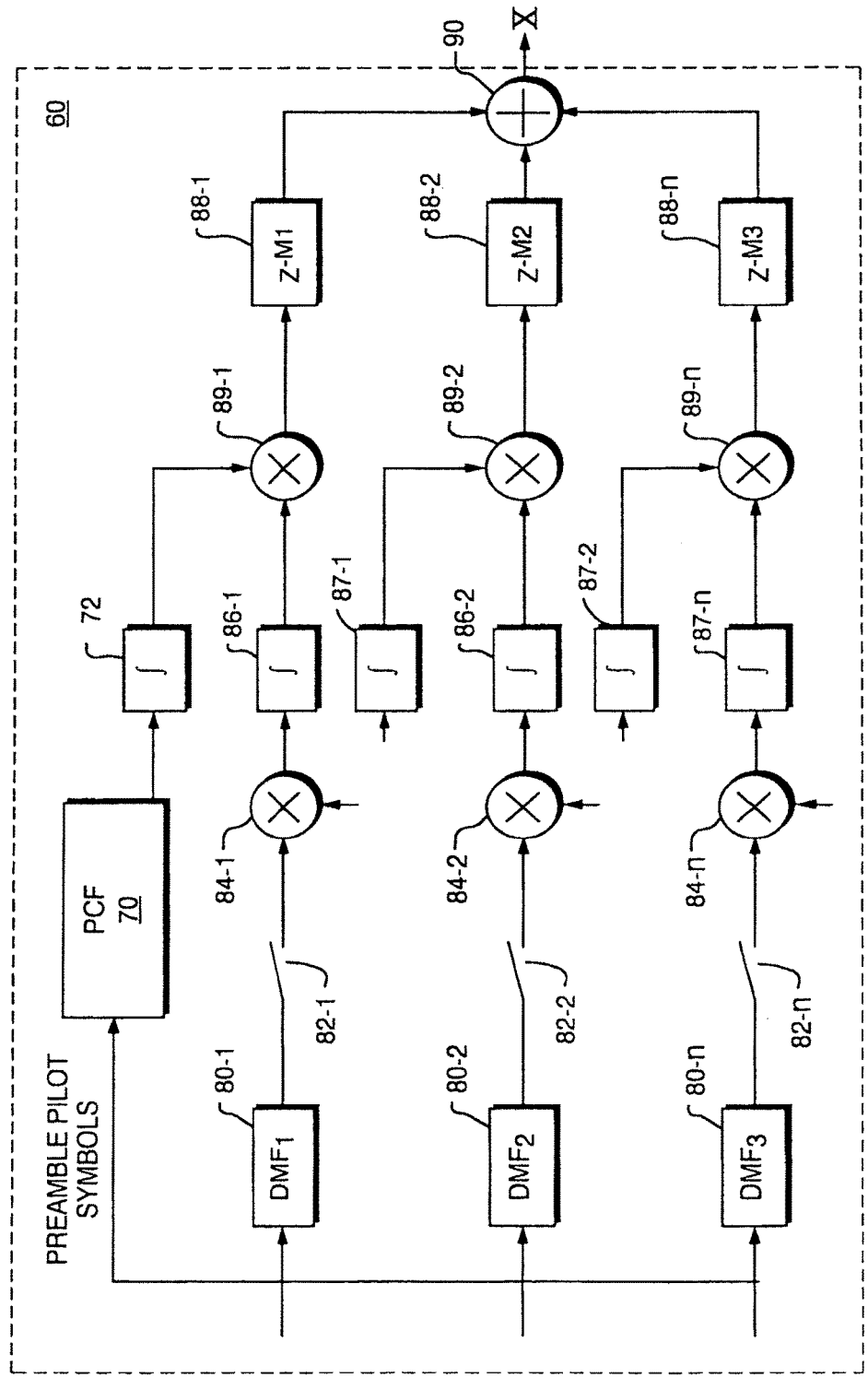
FIG. 4 is a more detailed view of the pilot symbol assisted coherent demodulators.

This receiver signal processing can now be understood more readily by reference to FIG. 4, which is a more detailed diagram of both the access acquisition function 60 and data decoding function 62. In particular, the access acquisition function 60 is seen to include a Pilot Correlation Filter (PCF) 70 as well as an integration function 72. As will be discussed in more detail below, the PCF 70 is a matched digital filter having coefficients matched to provide an impulse response to input preamble pilot signals.

The integration function 72 operates on successive outputs of the pilot correlation filter 70 to provide a smoothed estimate of timing information inherent in the pilot symbols.

The data decoding portions 62 each include a data matched filter 80, a selection function 82, a dot or "cross" product function 84, integration functions 86, and delay 88. A summer 90 operates on the outputs of the individual data decoders 62-1, 62-2, . . . , 62-n to provide an estimate of the payload data. Briefly, each of the data decoders 62 operates as a synchronous demodulator to provide an estimate of the data symbols for a given respective possible multipath delay. Although three data decoders 62 are shown in FIG. 4, it should be understood that a smaller number of them may be used depending upon the anticipated number of multipath delays in the system 10.

Figure 5:
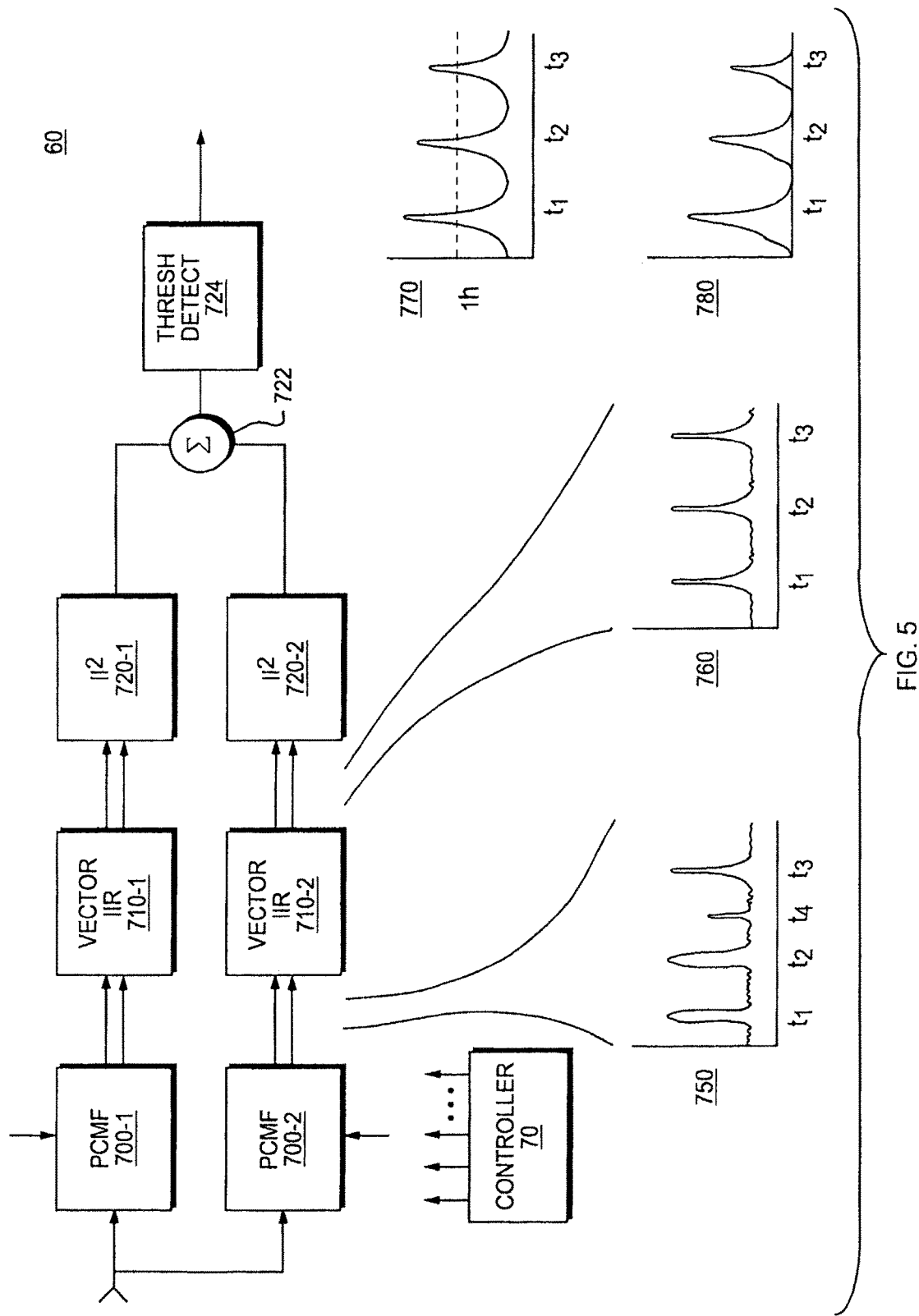
FIG. 5 is a still more detailed view of an access acquisition portion of the coherent demodulator.

FIG. 5 is a more detailed block diagram of the access acquisition function 60. This circuit includes the previously mentioned pilot correlation filter 70 in the form of a pair of pilot correlation matched filters (PCMFs) 700-1, 700-2, and a corresponding pair of vector infinite impulse response (IIR) filters 710-1 and 710-2. In addition, the integration function 72 is provided by the pair of magnitude squaring circuits 720-1 and 720-2, a summer 722, and threshold detector 724.

In operation, the access channel 41 signal is fed to the pilot correlation matched filter (PCMF) sections 700-1 and 700-2. The pair of PCMFs 700 are used in a ping pong arrangement so that one of the PCMFs may be operating on received data while the other PCMF is having its coefficients loaded. In the preferred embodiment, the access channel is encoded using 32 PN code chips per transmitted symbol. At the receiver, 8 samples are taken per chip (e.g., 8 times the chip rate of 1.2288 megahertz (MHz)). The pilot correlation matched filter 700 must not only be matched to receive the pilot symbols, but also to the particular pseudorandom noise (PN) code used for encoding the access channel. A controller is used to control the operation of the two portions of the access acquisition function 60, both the top half and bottom half, as illustrated.

Continuing with the discussion of the Pilot Correlation Filter 70, the vector IIR filter 710-1 receives the output of the PCMF 700-1 in the form of in-phase (I) and quadrature (Q) samples. As shown in the signal diagram 750 next to the output of the PCMFs 700, the output tends to be a series of peaks spaced apart in time, with the peak spacing, depending upon the multipath delays experienced on the reverse link. For example, a peak occurring at a first time T1 may be associated with the most direct signal path taken. A second peak may occur at a time T2 associated with a portion of the signal which follows an alternate path. Finally, a third peak may be associated with a time T3 which follows yet a different path from the field unit 20 to the base station 12. The series of peaks are output for each of the 48 symbols in the pilot burst. The function of the vector IIR filter 710-1 is thus to average these pilot bursts to provide a more well defined set of peaks 760 which represents the outputs of the PCMF 700-1 averaged over time. The averaging process implemented by the vector IIR filter 710-1 may, for example, eliminate a false peak, such as that occurring at time T4, which is attributable to a noise burst and not to an actual multipath signal portion.

The output 760 of the vector IIR filter 710 thus represents an estimate of where the true multipath peaks occur in the reverse link access channel 41.

Of ultimate interest is the signal level of the received pilot signal. To determine this level, the magnitude block 720-1 takes the magnitude of the vector IIR output signal 760. The sum circuit 722 thus sums these signals as provided by each of the two ping pong branches 700. A threshold detector 724 is then applied to the summed signal to provide an output similar to the plot 770. The threshold detector is set at a predetermined amplitude TH so that an output appears as in plot 780.

The points at which the summed signal output crosses the threshold TH indicate points at which rake fingers 62 will be assigned to processes the signal. In particular, the peaks occurring at times T1, T2 and T3 are examined, and each respective time is used and assigned to a respective data matched filter 80 and the corresponding finger 62. These provide an estimate of possible phases from the pilot symbols which is in turn used in the data decoding process.

Figure 6:
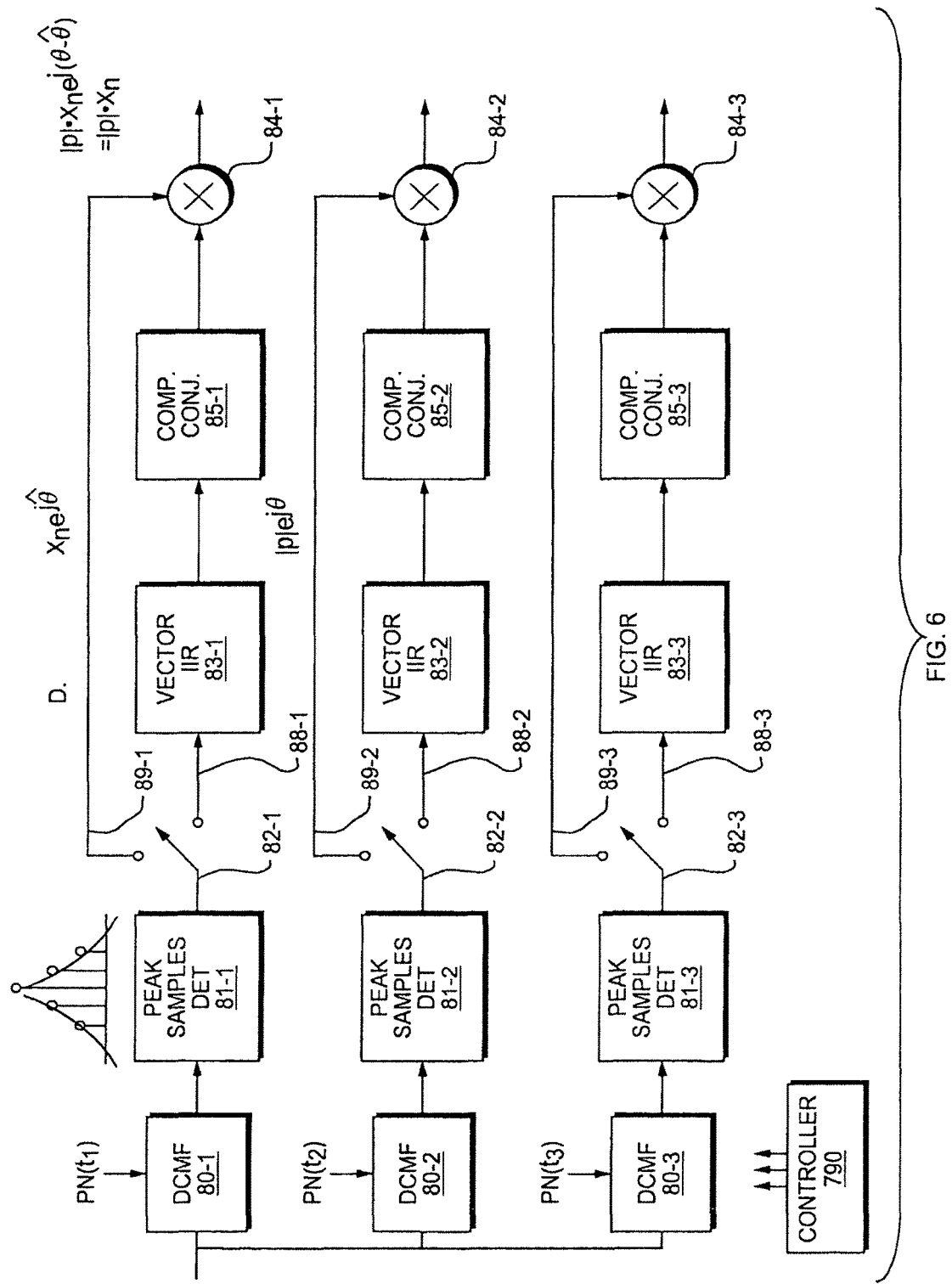
FIG. 6 is a more detailed view of a data detection portion of the coherent demodulator.

FIG. 6 illustrates how the data detection process of the three rake fingers 62. Each finger 62 is identical. An exemplary rake finger 62-1 consists of a corresponding Data Correlation Matched Filter (DCMF) 80-1, a peak sample detector 81-1, a switch 82-1, a vector IIR filter 83-1, complex conjugate function 85-1, and dot product circuit 84-1.

In operation, the access channel signal is first fed to the Data Correlation Matched Filter (DCMF) 80-1. This filter 80-1 is loaded with coefficients at a specific phase delay of the PN sequence. In this instance, the phase delay loaded is that data associated with the time T1 indicated from the output of the access acquisition function 60.

The output of data correlation matched filter 80-1 will consist of a signal having a localized peak. As shown in the diagram next to the peak sample detector 81-1, the peak sample detector 81-1 selects a predetermined number of samples around this peak for further processing.

These peak values are then fed to the switch 82-1. The switch 82-1, under the operation of the data decoder controller 790, alternately steers the peak detected signal, depending upon whether it contains pilot symbols or pilot plus data symbols. The decoder controller 790 may be synchronized with a start of frame indication as determined by the received Barter symbols in the preamble portion, and therefore knows the position of pilot symbols in the payload portion. Thus, while receiving the payload or data portion 52 of the access channel frame 50, the signal will be steered to the lower leg 88-1, in the case of receiving a pilot symbol, or in the case of receiving a data symbol, will be steered to the upper leg 89-1.

The pilot symbols of the payload portion 52 are processed in a manner similar to the pilot symbol processing in the preamble portion 51. That is, they are processed by a vector IIR filter 83-1 to provide an average estimate of an estimate signal value $[p]e^{j}$. The complex conjugate of this pilot estimate is then determined by the complex conjugate function 85-1.

Data symbols steered to the upper leg 89-1 provide a data estimate signal $x_n e^{j\theta}$.

The two estimate signals, data and pilot are then fed to the multiplier 84-1 to provide a cross product of the pilot symbols with the data symbols. This causes the phase terms of the complex signal to cancel more or less. That is, the phase estimate (theta) should be approximately equal to the measured phase theta of the pilot symbols. The output thus represents the pilot channel energy $|p|x_n$. Given a pilot symbol normalized value of 1, the data is therefore recovered.

Returning to FIG. 4, the reader will recall that this is the output of only one rake finger 62-1. Each rake finger output is, therefore, then fed through the integrators 86, 87, additional dot product circuits 89, and delays 88-1, to the summer 90 to provide a final estimate of the data, X.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method performed by a mobile device, the method comprising:
   generating, by a processor of the mobile device, first reference blocks and second reference blocks;
   producing, by the mobile device, a frame that includes a first part and a second part;
   wherein the first part includes the first reference blocks and data blocks;
   wherein every other block of the second part includes the second reference blocks and the second part does not include data blocks; and
   transmitting, by the mobile device, the frame.

2. The method of claim 1, wherein the first reference blocks and the second reference blocks are pilot symbols.

3. The method of claim 1, wherein a predetermined number of data blocks are between reference blocks of the first part.

4. The method of claim 1, wherein the reference blocks and non-reference blocks of the second part are time multiplexed.

5. The method of claim 1, wherein at least one of the first reference blocks is derived from an orthogonal code.

6. The method of claim 1, wherein the first reference blocks are derived from a first sequence and the second reference blocks are derived from a second sequence.

7. The method of claim 1, wherein the frame is a Code Division Multiple Access (CDMA) frame.

8. A method performed by a network device, the method comprising:
   receiving, by the network device, a frame from a mobile device, wherein the frame includes a first part and a second part;
   wherein the first part includes first reference blocks and data blocks; and
   wherein every other block of the second part includes second reference blocks and the second part does not include data blocks of the mobile device.

9. The method of claim 8, wherein the first reference blocks and the second reference blocks are pilot symbols.

10. The method of claim 8, wherein a predetermined number of data blocks are between reference blocks of the first part.

11. The method of claim 8, wherein the reference blocks and non-reference blocks of the second part are time multiplexed.

12. The method of claim 8, wherein at least one of the first reference blocks is derived from an orthogonal code.

13. The method of claim 8, wherein the first reference blocks are derived from a first sequence and the second reference blocks are derived from a second sequence.

14. The method of claim 8, wherein the frame is a Code Division Multiple Access (CDMA) frame.

15. A mobile device comprising:
   a processor configured to generate first reference blocks and second reference blocks;

the processor configured to produce a frame that includes a first part and a second part;
wherein the first part includes the first reference blocks and data blocks;
wherein every other block of the second part includes the second reference blocks and the second part does not include data blocks;
and
a transmitter configured to transmit the frame.

16. The mobile device of claim 15, wherein the first reference blocks and the second reference blocks are pilot symbols.

17. The mobile device of claim 15, wherein a predetermined number of data blocks are between reference blocks of the first part.

18. The mobile device of claim 15, wherein the reference blocks and non-reference blocks of the part are time multiplexed.

19. The mobile device of claim 15, wherein at least one of the first reference blocks is derived from an orthogonal code.

20. The mobile device of claim 15, wherein the first reference blocks are derived from a first sequence and the second reference blocks are derived from a second sequence.

21. The mobile device of claim 15, wherein the frame is a Code Division Multiple Access (CDMA) frame.

22. A network device comprising:
circuitry configured to receive a frame from a mobile device, wherein the frame includes a first part and a second part;
wherein the first part includes first reference blocks and data blocks; and
wherein every other block of the second part includes second reference blocks and the second part does not include data blocks of the mobile device.

23. The network device of claim 22, wherein the first reference blocks and the second reference blocks are pilot symbols.

24. The network device of claim 22, wherein a predetermined number of data blocks are between reference blocks of the first part.

25. The network device of claim 22, wherein the second reference blocks and non-reference blocks of the second part are time multiplexed.

26. The network device of claim 22, wherein at least one of the first reference blocks is derived from an orthogonal code.

27. The network device of claim 22, wherein the first reference blocks are derived from a first sequence and the second reference blocks are derived from a second sequence.

28. The network device of claim 22, wherein the frame is a Code Division Multiple Access (CDMA) frame.

* * * * *